(12) United States Patent
Bomgaars et al.

(10) Patent No.: US 6,485,212 B1
(45) Date of Patent: Nov. 26, 2002

(54) DEVICE FOR APPLYING LIQUID TO VEHICLE TIRES

(76) Inventors: Gregory Jay Bomgaars, 9171 E. Westview Rd., Littleton, CO (US) 80124; Robert Anthony Terranova, 327 Cherry St., Castle Rock, CO (US) 80104

( * ) Notice: Subject to any disclaimer, the term of this patent is extended or adjusted under 35 U.S.C. 154(b) by 0 days.

(21) Appl. No.: 09/718,006

(22) Filed: Nov. 21, 2000

(51) Int. Cl.[7] .......................... A47L 25/00; B05C 17/00
(52) U.S. Cl. .................. 401/11; 15/244.1; 401/119; 401/130; 401/146; 401/206; 401/263; 401/266; 401/267
(58) Field of Search ................... 401/9, 10, 11, 401/118, 119, 126, 130, 146, 205, 206, 263, 266, 267; 15/244.1

(56) References Cited

U.S. PATENT DOCUMENTS

| | | | |
|---|---|---|---|
| 3,410,645 A | * 11/1968 | Schwartzman | .......... 401/206 X |
| 4,763,377 A | 8/1988 | Madsen | |
| 4,779,386 A | * 10/1988 | Harris | .................. 401/266 X |
| 4,963,047 A | 10/1990 | Trotta | |
| D331,151 S | 11/1992 | Kiefer | |
| D343,036 S | 1/1994 | Khanzadian | |
| 5,678,277 A | 10/1997 | Sorenson | |
| 5,857,238 A | * 1/1999 | Jmill | .................... 15/244.1 X |
| 5,896,616 A | 4/1999 | Large | |
| D416,653 S | 11/1999 | Silvers | |
| 6,048,583 A | 4/2000 | Waddell | |
| 6,224,283 B1 | * 5/2001 | Hay | ...................... 401/146 X |

* cited by examiner

*Primary Examiner*—Gregory Huson
*Assistant Examiner*—Kathleen J. Prunner
(74) *Attorney, Agent, or Firm*—Henry L. Smith, Jr.

(57) ABSTRACT

A swiveling handle is attached to a square, rectangular, or oval curved base plate, with curvature selected to match the curvature of a vehicle tire sidewall. A pad containing the liquid or gel to be applied to a tire is attached to the underside of the curved base plate in order to contact the tire sidewall, so that one quick circular motion of the operator's hand applies the liquid or gel uniformly to the entire sidewall of the tire. A matching holder with a curved sponge or pad for resaturating the pad on the curved base plate may be included.

20 Claims, 3 Drawing Sheets

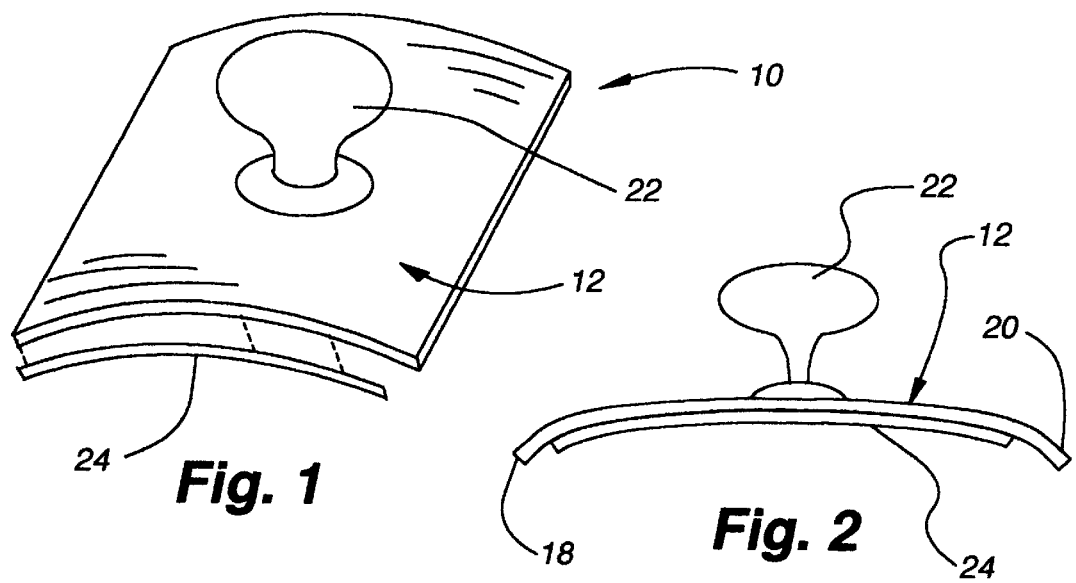
Fig. 1
Fig. 2
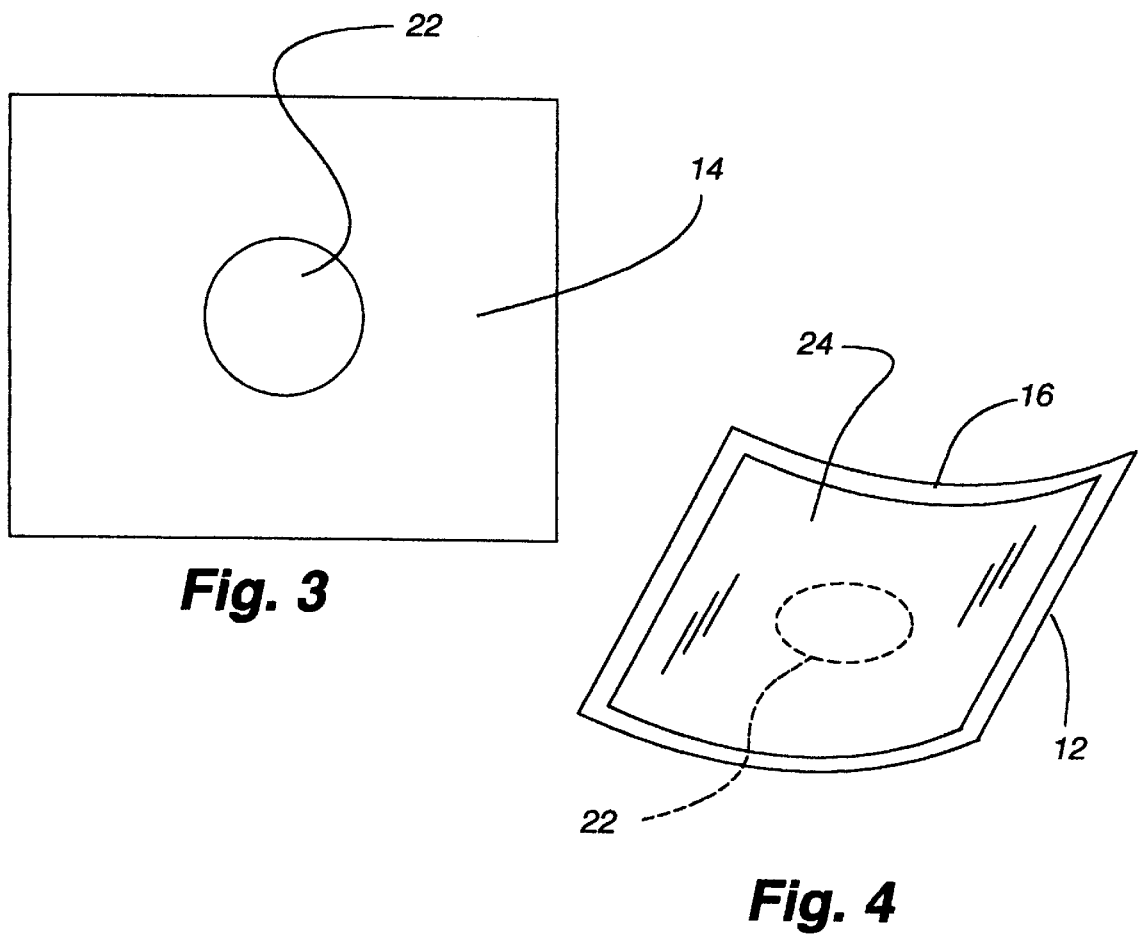
Fig. 3
Fig. 4

DEVICE FOR APPLYING LIQUID TO VEHICLE TIRES

BACKGROUND—FIELD OF INVENTION

The invention is a device for applying liquid such as a cleaning or conditioning liquid to a vehicle tire, to improve its appearance or to condition or protect its surface against weather, or road dirt.

BACKGROUND—DESCRIPTION OF PRIOR ART

In the car wash and car detailing industry, and in home use by consumers, it is important to clean the vehicle's tires to improve their appearance by adding shine, or to coat the tires with a liquid which conditions the tire rubber or protects it from road dirt by repelling dirt or water, or from light, air pollution, or petroleum products on the road. This art includes various liquids which may be applied to the tires for this purpose, and various applicators have been tried for applying the liquid. Applicator devices in the art have numerous drawbacks and limited flexibility, and some take an unreasonable amount of time, in many cases 500% longer, to use. Fast liquid application is needed by car washes in order to increase the number of cars that can be processed per hour. Being not ergonomically friendly for human hands and arms, existing applicators tire the arm and shoulders of the operator, and require more effort to cover all tire sidewall surfaces. Existing applicators result in the liquid or gel getting on the operator's hands, and waste the liquid or gel for that reason and because the liquid or gel leaks off the applicator. Existing applicators do not easily provide even coating of the liquid or gel on the tire, and they do not have a removable pad for replacement or cleaning. With most existing applicators, the liquid must be sprayed on the tire before using the applicator, thus contaminating the clean car in a windy environment. Most existing applicators are small and must be moved around the tire several times to cover all the tire surface, and some require several minutes for the liquid to soak into the applicator before use. Existing sponge-based applicators wear out with only 12–16 uses and must be discarded U.S. Pat. No. 5,896,616 to C. F. Large, Apr. 27, 1999, discloses an applicator for spreading a liquid onto the sidewall of a tire. It is constructed of a curved porous material with a gripping handle. The drawback of this device is that it requires some time to move the applicator over the curved tire, and the operator using the device must change his or her grip as the applicator moves around the tire. The porous material easily wears away or becomes dirty and is not replaceable. When dry, the applicator has to be dipped in the liquid again. U.S. Pat. No. 6,048,583 to R. L. Waddell, Apr. 12, 2000, discloses a tire brush fitted with a hose and pressurized container of liquid. This device is complicated, expensive to make, and requires time to reload liquid in the liquid container and reconnect the hose.

SUMMARY OF INVENTION

The present invention is a simple and innovative device for very rapidly applying liquids or gels to tires. The curved surface of the device conforms to the tire's shape. It also includes a handle for easily and securely gripping the device without having to change grips as the device moves around the entire circumference of the tire. The inside curved surface of the device has an absorbent pad of sufficient porosity for holding enough liquid or gel to treat the tire, while not holding excess liquid which would be squeezed out and lost when the device is applied to the tire. The liquid holding absorbent pad may be made removable for cleaning and replacement when worn. The invention may also include a holder for the curved plate, where the holder is a rectangular or oval shaped box with a curved sponge or pad saturated with the liquid to be applied.

OBJECTS AND ADVANTAGES

The objects and advantages of the present invention are:

1. The device is easy and cheap to manufacture.
2. The device provides secure gripping for the operator using it, without contact between the liquid or gel and the hands of the operator, thus preventing contamination of car cleaning towels and the car itself
3. The device can be very rapidly applied to the whole tire by means of one quick rotational motion of the operator's hand around the circumference of the tire without changing grip.
4. The device fits the contour of the tire, and the curve of the device is such that good contact with the tire by the liquid containing pad is assured; the flexible and compressible thickness of the pad also contributes to the uniform contact with the tire.
5. The pad can be easily replaced when worn or dirty, and is cheap to replace. The pad can be an existing paint pad or bristle pad, known to those skilled in the art,
6. The pad, unlike a sponge, will hold an appropriate amount of liquid without wasting liquid, as is the case when too much pressure is applied to a tire by a device containing a sponge. There is no waste of liquid as with other devices which may sling liquid onto the clean surface of the washed car.
7. The curve of the device insures contact by the pad with the entire sidewall surface of the tire, from the tire rim to the portion of the tire in contact with the pavement.
8. The handle is attached to the curved plate so that it can swivel as the operator's hand rotates around the tire, so that it is less tiring to the arms and hands of the operator.
9. The swiveling handle can contain a reservoir for the liquid being applied, thus saving time in reloading the device with more liquid or gel. Use of clear plastic for the handle will enable the operator to see the level of remaining liquid in the reservoir.
10. Because the device swivels and is curved to contact the entire tire surface, the liquid can be applied very quickly and uniformly with one quick rotation of the operator's hand around the circumference of the tire.
11. The handle shape is adapted for use by operators of varying hand size.
12. The pad can be switched to a coarser pad for use in cleaning the tire or whitewalls of the tire.
13. The holder for the device prevents the pad on the curved base plate and the pad in the holder from drying out when the curved base plate is kept in the holder.
14. The pad, not being a sponge as in other applicators, will not absorb water from a wet tire and thus dilute the liquid or gel, thus resulting in an inferior looking tire.

Still further objects and advantages will become evident from the detailed description of the invention, and the drawings.

DRAWING FIGURES

FIG. 1 is a perspective view of the device showing the handle 22 and curved base plate 12, with the liquid absorbent pad 24 underneath.

FIG. 2 is a cross sectional view showing the handle 22, curved base plate 12 and liquid holding pad 24.

FIG. 3 is an axial view looking down on the top of the device, showing the handle 22 and top 14 of the base plate.

FIG. 4 is a perspective view of the underside surface 16 of the base plate 12 showing the pad 24 and handle 22 on the opposite side.

FIG. 5 is a cross sectional view showing the handle 22, attaching bolt 25, washer 21, base plate 12 and two engaging pad attachment layers 23, one attached to the pad 24 and one attached to the plate 12.

Figure 5:
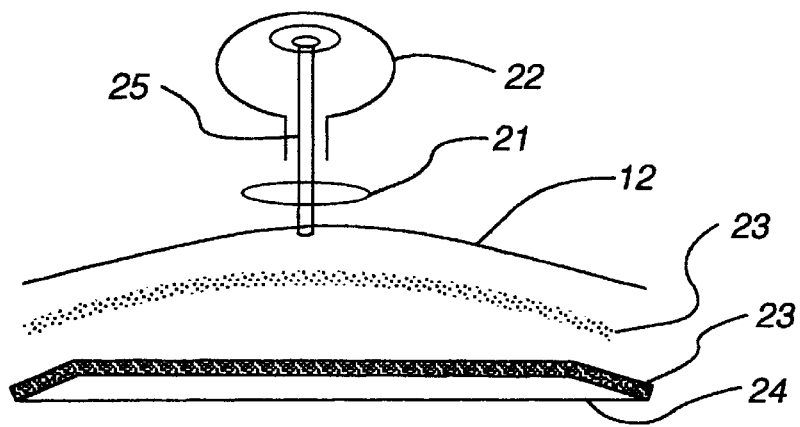

REFERENCE NUMERALS IN DRAWINGS 10 liquid applying device
11 rounded corners
12 curved base plate
14 convex top surface of base plate
16 concave bottom surface of base plate
18 left curved base plate edge
20 right curved base plate edge
21 washer
22 swiveling handle
23 pad attachment layers
24 liquid absorbent pad
25 attaching bolt
26 holder box
28 holder sponge or pad
30 liquid to be applied

DETAILED DESCRIPTION OF THE DRAWINGS

FIG. 1 shows handle 22 attached to the curved base plate 12. Pad 24 which hold s the liquid or gel is shown in a position ready to be attached to the concave bottom surface of the base plate.

FIG. 2 shows handle 22 attached to base plate 12, and pad 24 attached to base plate 12. The Figure also shows left curved plate edge 18 and right curved plate edge 20 of base plate 12, said edges being curved to conform to the curve of typical vehicle tire sidewalls.

FIG. 3 shows the handle 22 attached to the convex top surface 14 of the base plate 12.

FIG. 4 shows the bottom concave surface 16 of the base plate 12, along with the liquid absorbent pad 24 attached to said surface 16. The handle 22 on the opposite side of the base plate 12 is also shown. In the preferred embodiment, the degree of curve of left and right plate edges 18 and 20 is selected to match the curvature of the most common passenger vehicle tires, and some variation in tire curvature can be accommodated because the pad 24 is somewhat compressible so as to conform to some variations in tire sidewall curvature while still maintaining contact between the pad and the tire sidewall. Other versions of the invention are possible with curvature of plate edges 18 and 20 matching the curvature of vehicle tires which are larger or smaller than the average passenger vehicle tire.

FIG. 5 shows a version of the handle without a reservoir attached to the base plate 12 in a manner which allows the handle to swivel in relation to the plate 12 in contact with the washer 21. In one embodiment, a bolt 25 goes through the handle and washer to screw threads in the base plate 12, or through the base plate to a nut in contact with the curved bottom side of the base plate. Details of all these means of attaching the handle are not shown and are well known to those skilled in the art. FIG. 5 also shows Velcro (or similar attachment means 23, including but not limited to adhesives and glues) attached to the bottom concave side of the base plate 12 and to one surface of the pad 24, whereby the pad can be releasably attached to the bottom concave side of the base plate.

Figure 6:
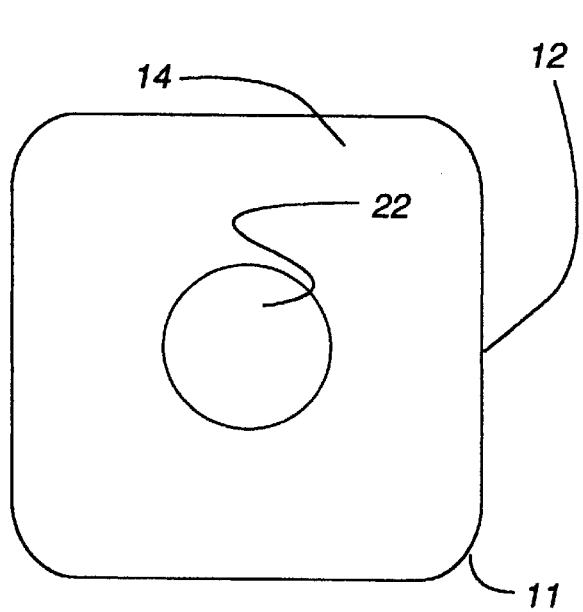
FIG. 6 shows the version of the invention with rounded base plate corners 11.
Figure 7:
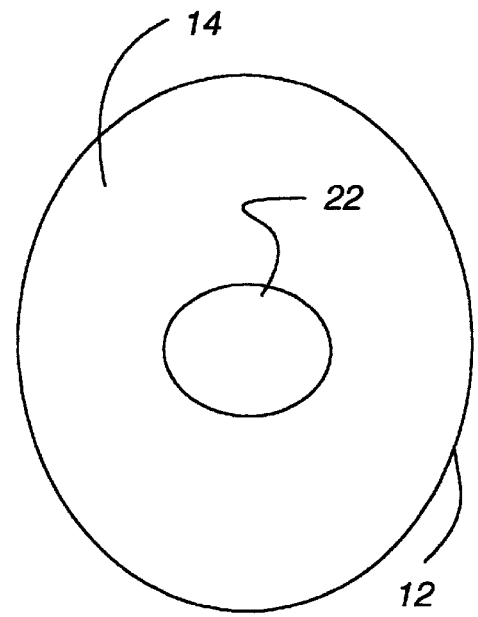
FIG. 7 shows the version of the invention with an oval shaped base plate 12.

FIG. 6 shows a version of the square or rectangular base plate 12 with rounded corners 11 which prevent the base plate from digging into or scratching the tire sidewall as the base pate and handle move around the circumference of the tire. FIG. 7 shows the handle 22 and a base plate 12 which is oval in shape.

Figure 8:
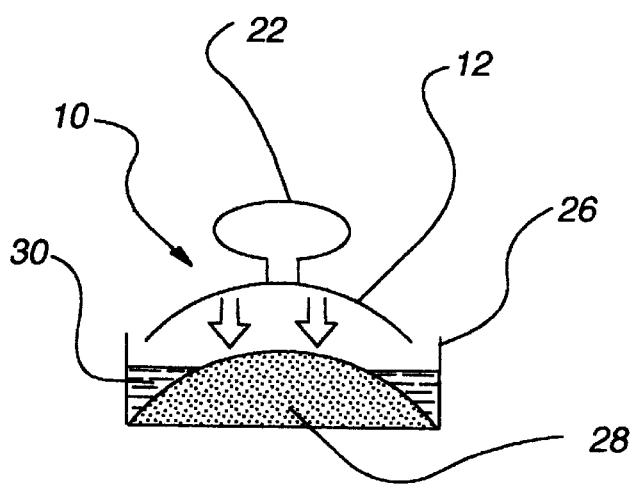
FIG. 8 is a cross sectional view which shows the holder box 26 for the liquid applying device 10.
Figure 5A:
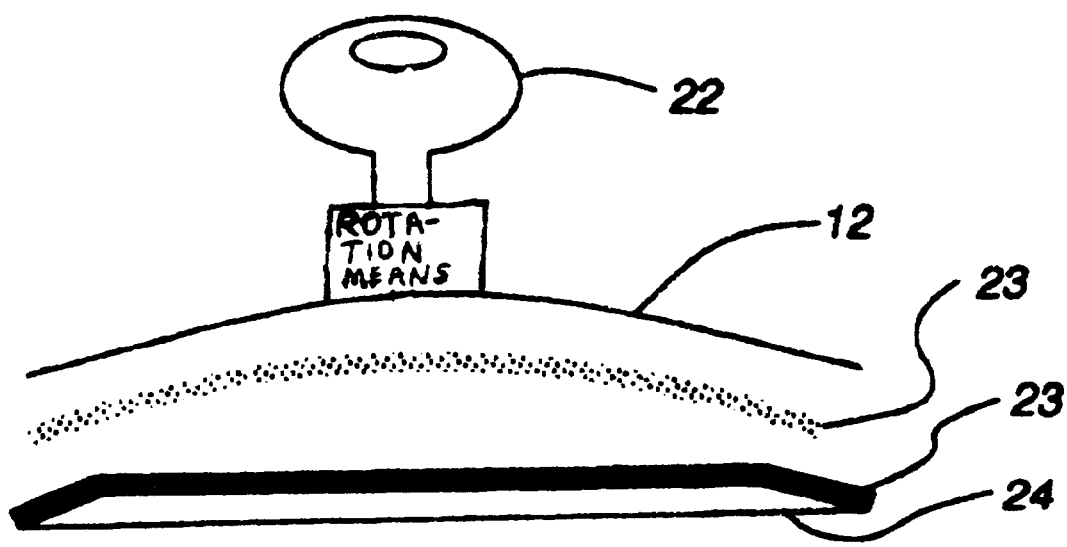

FIG. 8 is a cross sectional view of the holder 26 for the liquid applying device 10. The plate 12 rests on the curved sponge or pad 28 in the holder 26 when not in use. The holder 26 has the same shape as the base plate 12—rectangular or square with rounded corners, or oval as the case may be. Thus a snug fit is provided between the base plate 12 and device 10, and the edges of the holder, thus preventing evaporation of the liquid or gel 30. When the plate and handle are in use, the plate 12 is pressed against the curved pad or sponge 28 in the holder 26 to resaturate it with liquid or gel for further treatment of tires.

DESCRIPTION—PREFERRED EMBODIMENT

In the preferred embodiment of the invention, a handle 22 made of plastic, wood or similar suitable formable material is attached to the base plate 12 by an attachment means which permits the handle to easily rotate with respect to the base plate 12. Such attachment means may be comprised of a bolt 25 through the axis of the handle 22 which engages screw threads in the base plate 12, or a nut under the base plate (not shown). A washer 21 is also placed between the handle 22 and the base plate 12 such that the bolt 25 is positioned through the washer. All details of this structure are not shown, but it and other functionally equivalent means of attaching the handle to the base plate, so that the handle can rotate, are well known to persons skilled in the art. The pad 24 may be permanently attached to base plate 12, but in the preferred embodiment, pad 24 has a layer of Velcro or similar engaging material bonded to one surface of the pad, and the concave bottom surface 16 of the base plate 12 has a similar layer of Velcro or similar engaging material bonded to surface 16, so that the Velcro on the pad 24 and the Velcro on surface 16 engage each other so that the pad can be removed for replacement or cleaning.

Operation of the Invention

The invention can be operated easily and quickly by an operator as follows. The operator grasps the handle 22, dips the pad 24 in the liquid to be applied, which is contained in the sponge or pad 28 in the holder 26, or applies liquid to the pad by a squirt bottle or similar device, and then positions the invention so that the concave bottom surface 16 of the invention, which contains the pad 24, is positioned to uniformly contact the convex curved surface of the vehicle tire. With one quick motion of the operator's hand around the circumference of the tire, while gentle pressure is applied by the hand to keep the pad 24 in contact with the tire sidewall, the pad 24 will spread the liquid or gel uniformly across the entire tire sidewall surface from the tire rim all the way out to the edge of the tire in contact with the pavement on which the vehicle rests. The invention's speed and uniformity of liquid application are two major advantages of the invention. Both of these factors mean that car wash operators can process more car tires more quickly and with higher quality results.

Additional Embodiments

The device can be constructed with a flexible base plate 12 to help the plate to conform to a wider range of tire sidewall curvatures. The device can be made with curved corners 11, or in an oval shape as in FIG. 7. The device could be constructed so that a supply of liquid is contained in a cavity inside the handle 22, so that the liquid can be moved to the pad 24. The invention may also include a holder 26 for the but 10 when not in use or when it is desired to resaturate the pad 24 with liquid. The holder 26 can be a rectangular open box containing a curved sponge or pad 28, saturated with the liquid, on which the pad 24 on the base plate rests when not in use, or to which the pad 24 on the base plate 12 is pressed in order to resaturate the pad on the base plate. The holder 26 may have an oval shape or rectangular shape with rounded corners to accommodate units 10 with the shapes disclosed above. The device can be used to clean tire sidewalls by using a suitable cleaning liquid, in which case the pad 24 on the curved base plate 12 may be made of a material with rougher or more fibrous texture, or with stiffer projecting bristles, to facilitate cleaning.

Conclusions, Ramifications, and Scope

A number of changes are possible to the structure described above, while still remaining within the scope and spirit of the invention. Many variations are possible in the invention. The handle 22 could be made of various materials and formed in varying shapes to facilitate gripping by the human hand. A number of mechanical means, known to those skilled in the art, could be used to attach the handle 22 to the base plate 12 so that the handle can easily rotate with respect to the base plate 12. The base plate 12 could be made of various materials such as plastics, metals, or fiberglass, including materials with enough flexibility to easily conform to variations in tire sidewall curvature. The pad could be permanently attached to concave bottom surface 16, or releasably attached by various means 23 other than Velcro, including various glues and adhesives known to those skilled in the art. The pads 24 could have various structures and densities and porosities depending on how often it is desired to resaturate the pads with liquid or gel, the viscosity of the liquid or gel and the like. The pads 24 could vary in compressibility so as to accommodate a wider range of tire curvature variations. Pads 24 could vary as to strength and durability and ease of dirt removal. The handle 22 could have various means for storing the liquid to be applied and for communicating the liquid down to the pad. The specifics described in the invention above are not intended to be limiting in scope. The scope of the invention is to be determined by the claims, and their legal equivalents, not the examples given above.

We claim:

1. A device for applying liquids or gels to various vehicle tire sidewalls, said device comprising:
   (a) a curved base plate fitting the contour of a tire sidewall to be treated and having a convex top surface and a concave bottom surface, wherein the curvature is selected to substantially conform to the curvature of said tire sidewall being treated,
   (b) a handle connected to the convex top surface of said curved base plate and shaped for gripping by the human hand, and
   (c) an absorbent pad adapted to hold the liquid or gel to be applied, wherein said pad is attached to the concave bottom surface of said curved base plate,
whereby said pad of said device, because of said base plate fitting the contour of the tire sidewall, is adapted to stay in contact with said tire sidewall when said device slides along said tire sidewall when moved by the human hand, thus applying said liquid or gel to the entire tire sidewall in one continuous motion of the human hand around the tire.

2. The device of claim 1 wherein the curved base plate is square or rectangular in overall shape.

3. The device of claim 2 wherein the square or rectangular base plate has rounded corners.

4. The device of claim 1 wherein the curved base plate is oval in shape.

5. The device of claim 1, wherein the handle is connected to said curved base plate by a means for allowing the handle to rotate or swivel with respect to said base plate.

6. The device of claim 5 wherein the curved base plate is square or rectangular in overall shape.

7. The device of claim 5 wherein the curved base plate has rounded corners.

8. The device of claim 5 wherein the curved base plate is oval in shape.

9. The device of claim 1 wherein said pad is releasably attached to the concave bottom surface of said curved base plate by a means for releasably attaching the pad to said bottom surface.

10. The device of claim 9 wherein the handle is connected to said curved base plate by a means for allowing the handle to rotate or swivel with respect to said base plate.

11. The device of claim 10 wherein the curved base plate is square or rectangular in overall shape.

12. The device of claim 11 wherein the square or rectangular curved base plate has rounded corners.

13. The device of claim 10 wherein the curved base plate is oval in shape.

14. The device of claim 1 wherein said curved base plate is made from a material with sufficient flexibility to conform to a range of curvatures of various tire sidewalls when pressure is applied by the human hand to said handle.

15. The device of claim 14 wherein the handle is connected to said curved base plate by a means for allowing the handle to rotate or swivel with respect to said base plate, and wherein said pad is releasably attached to the concave bottom surface of said curved base plate by a means for releasably attaching the pad to said bottom surface.

16. The device of claim 15 wherein the curved base plate is square or rectangular in overall shape.

17. The device of claim 16 wherein the square or rectangular base plate has rounded corners.

18. The device of claim 15 wherein the curved base plate is oval in shape.

19. The device of claim 1 further comprising a matching holder for the device, said holder comprising:
   a) a box with top side open,
   b) a curved sponge or pad attached to bottom of said box with its curvature matching the concave bottom surface of the base plate of the device, such sponge or pad in the box being capable of being saturated with the liquid or gel to be applied,
whereby the base plate can be kept in said holder when not in use, and whereby said absorbent pad attached to said device can be re-saturated with liquid during use by pressing the pad attached to said device against the curved sponge or pad in the holder.

20. The device of claim 19, wherein the cross sectional size and shape of the box match the cross sectional size and shape of the device so as to create a substantially air-tight seal between the device and the box when the device is placed on the curved sponge or pad in said box.

* * * * *